July 7, 1936. E. P. ENGSTROM 2,046,372
HEAT EXCHANGING MOLD
Filed June 12, 1935
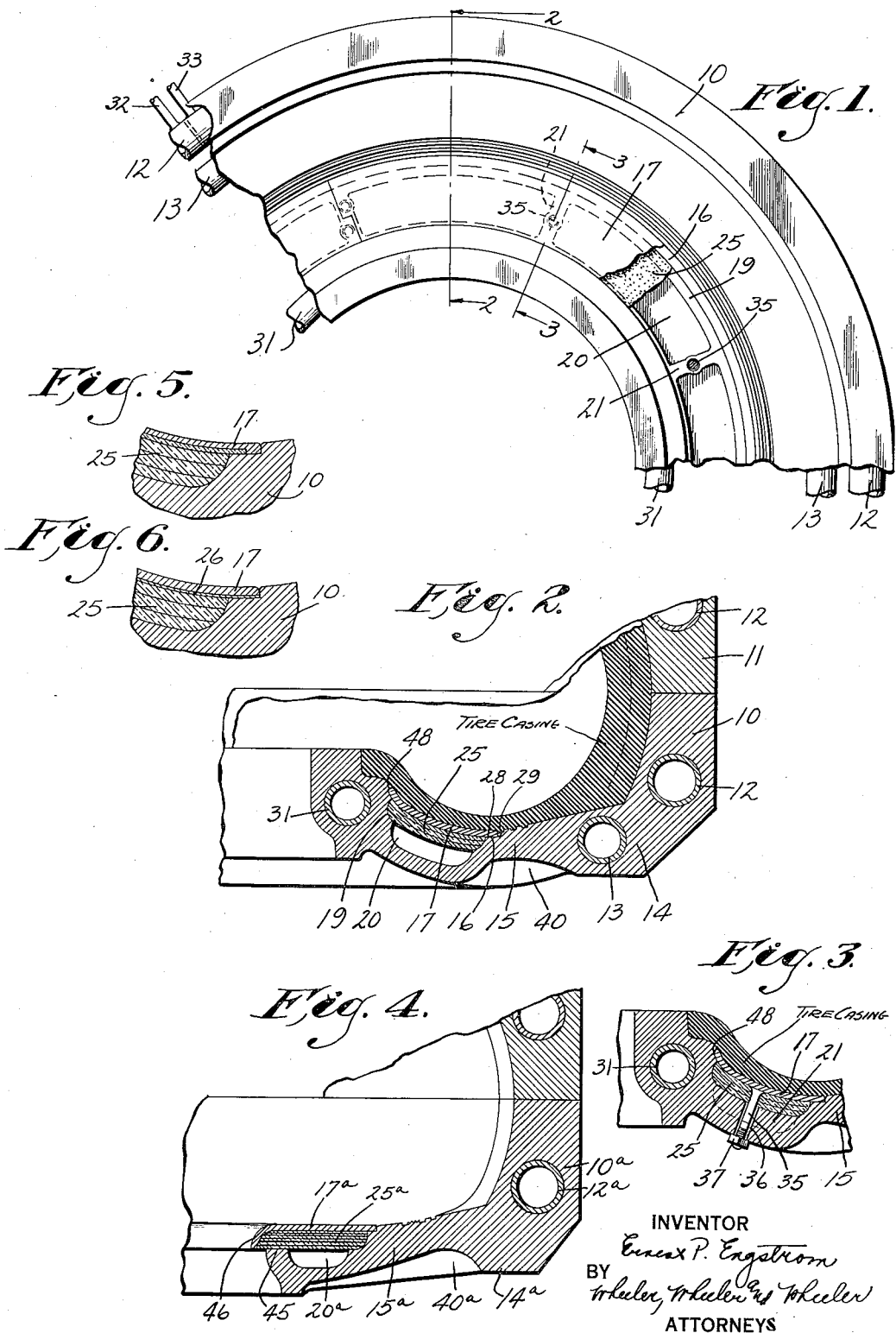
INVENTOR
Ernest P. Engstrom
BY Wheeler, Wheeler and Wheeler
ATTORNEYS Patented July 7, 1936

2,046,372

UNITED STATES PATENT OFFICE 2,046,372

HEAT EXCHANGING MOLD

Ernest P. Engstrom, Waupun, Wis., assignor to The Shaler Company, Waupun, Wis., a corporation of Delaware Application June 12, 1935, Serial No. 26,198

19 Claims. (Cl. 18—38)

This invention relates to improvements in heat exchanging molds, particularly vulcanizing molds.

The object of my invention is to provide improved means for regulating the rate of heat exchange from the mold to the material to be heated, whereby each portion of the material may be subjected to a temperature predetermined in accordance with its requirements.

For example, in the manufacture of vehicle tire casings, the rubber in the tread portion is of considerable thickness as compared with that in the side portions, and there is a gradual gradation between the thickness of the tread portion and that in the side portion, the rubber covering being comparatively thin in the vicinity of the rim engaging bead.

For proper vulcanization of rubber, the time and temperature factors are inversely related, quick vulcanization requiring a high temperature for a short period of time, whereas substantially the same degree of vulcanization may be accomplished by lowering the temperature and prolonging the interval, assuming of course that the temperature is maintained within a proper range for vulcanization. The composition and quality of the rubber are factors to be taken into account in determining the temperature and the time interval most suitable for the vulcanization of a casing of a given weight or thickness. In general, the better grades of vulcanized rubber are obtained by maintaining a moderate vulcanizing temperature and prolonging the time interval until the rubber has been properly "cured".

It is an object of my invention to provide means whereby, after predetermining the requirements for a given tread covering, it becomes possible to transmit heat to the sides in a definite proportion to the relative thickness of the rubber blanket in the sides as compared with that in the tread, or in cases where the quality or composition of the rubber is varied at the sides of the tire as compared with that in the tread, the degree of heat may be varied accordingly.

In the art of vulcanizing tires, times and temperatures most satisfactory for any given job are subjects of calculation according to well-known standard methods. An important object is to provide a mold which will facilitate comformity with these standards throughout the various parts of the mold, whereby over vulcanization in certain parts and under vulcanization in other parts may be avoided, and whereby the production of ribs, irregular, or defective surfaces may also be avoided.

A further object of my invention is to provide an improved mold peculiarly adapted for the re-treading of tire casings, in such a manner as to substantially avoid applying vulcanizing temperatures to portions of a casing which have been previously cured, and in which deterioration or over vulcanization would otherwise result. My invention contemplates means for obtaining a predetermined gradual reduction of temperature from the uncured rubber in the re-treaded surface to the previously cured rubber in the sides of the casing, uncovered or substantially uncovered by uncured rubber, in such a manner that the transition from the new rubber coating to the old coating will scarcely be observable.

In the drawing:

Figure 1 is a fragmentary view of the inner face of a mold or mold section embodying my invention, with the heat regulating coverings successively broken away to show the heat intercepting air pockets in those portions of the mold which cover the sides of a tire casing during a vulcanizing operation.

Figure 2 is a sectional view of the same, drawn to line 2—2 of Figure 1, and showing a fragment of the counterpart half section or portion of the mold.

Figure 3 is a sectional view, drawn to line 3—3 of Figure 1.

Figure 4 is a sectional view similar to Figure 2, but showing a re-treading mold in its preferred form.

Figures 5 and 6 are detail sectional views showing modifications of the heat regulating plates.

Like parts are identified by the same reference characters throughout the several views.

In the embodiment of my improved mold as illustrated in the drawing, I prefer to form the mold in two half sections, the mold being divided in the customary manner on a plane extending through the center of the tread. The external and internal contours of the mold will conform generally to standard practice, in which the internal contour determines the shape of the tire casing to be formed, or at least of the tread surface, where a casing is being re-treaded.

But the heat transmitting castings 10 and 11 are provided with embedded tubing 12 in the tread forming portions, and embedded tubing 13 of smaller diameter in the shoulder portions 14. The side or apron portion 15 is provided with an annular recess 16 adapted to receive a metal plate 17, the curvature of which corresponds with the desired curvature of the inner face of this portion of the mold. The annular recess 16 has narrower portions 19 of greater depth and portions 20 of still less width. These deeper portions of the recesses are arcuate in form and are separated from each other by narrow ribs 21 which form supporting ledges for the heat conducting plate 17.

The recess cavities 19 receive a series of non-heat conducting pads 25 and may have one or more plates 26 of heat conducting material which may be of different conductivity from that of the steel plate 17.

The deeper portions 20 of these recesses or channels constitute air pockets which limit heat transfer from the body of the mold to the pads 25, and the pads 25 cooperate in limiting transfer of heat to the plates 26 and 17. Their margins rest upon the ledges formed by enlargement of the width of these portions of the recesses as compared with that of the deeper portions 20, and while some heat will be received by the pads from this portion 15 of the body of the casting, only a small number of heat units will be transmitted in this manner to the plate 17. The plate 17 will receive heat marginally along its inner surface 28 and along the shoulder 29 which forms the side margin of the channel in which this plate is received.

The rate of heat transfer of the plate 17 may be varied in different molds by varying the width of the surface 28 and the thickness of the shoulder at 29.

Therefore, the areas of the surfaces 28 and 29 should be carefully predetermined when precision results are of importance.

At the opposite side of the margin of the plate 17, i. e., at the side adjacent the bead embracing portion of the mold, similar contacting surfaces permit heat transfer from the casting body to the plate 17. This portion of the casting body may also be provided with a heating tube 31. Heating fluid, such as steam or hot water, may be circulated in the various tubes to raise the temperature of the body casting to the desired degree, each tube having supply and discharge ducts 32 and 33, as shown in Figure 1.

By providing tubes 12 of greater diameter than the tubes 13 and 31 the tread embracing portions of the casting may be kept at a higher temperature than the other portions, thereby compensating for the greater thickness of the tread by proportionally increasing the rate of vulcanization. It is also possible to circulate fluid through the tubes 12 at a higher temperature than that in the other tubes, and if desired, other means may be employed for heating the body casting, the tubes not being essential to the invention herein disclosed.

Any suitable means may be employed for holding the plate 17 in place, and thereby also holding the pads 25 and 26 in place. In the construction illustrated, the plates 17 are provided with integral bolts 35 which extend through holes 36 to the exterior of the body casting. These holes are formed in the ribs 21 and are of somewhat larger size than the bolts 35, to allow for the unequal expansion of the bolts 35 as compared with that of the body of the casting, which will ordinarily be formed of aluminum or aluminum alloy. Exterior nuts 37 may be employed to clampingly hold the plate 17 in position and provide sufficient pressure contact to obtain good heat exchange through the contacting surfaces at 28.

The ribs 21 are in contact with the plate 17 and support it, but these ribs have comparatively small cross section and readily lose heat to the air at the respective sides. Therefore, they are ineffective to transfer many heat units to the plate.

In cases where the mold is to be employed for re-treading tires, the body casting may be of the form disclosed in Figure 4. A tread embracing portion 10a may be heated by an internal tube 12a as above described with reference to Figures 1 and 2. The shoulder portion 14a and the side portion 15a may be provided with external recesses 40a, similar recesses 40 being provided in the body casting shown in Figures 1 and 2. These external cavities 40 and 40a provide for some reduction in the number of heat units transferred to the side of the casing from the shoulder portion 14a.

The air cavities or pockets 20a, the pads 25a, and the internal heat transmitting plate 17a may be similar to the cavities, pads, and internal plate above described with reference to Figures 1 and 2, except in the following particulars.

The body casting may be terminated in a bearing wall 45 forming the outer wall of the cavity 20a. The padding may rest directly upon this bearing wall, and the plate 17a may be curved outwardly at 46 to embrace the margins of the pads and hold them in place, it being unnecessary to provide a bead embracing portion for a re-treading mold.

The number and thickness of the pads 25 may be varied to suit requirements. Reference has already been made to the use of a pad 26 of greater conductivity than the pads 25 and of different conductivity than that of the plate 17a, or 17.

This plate or pad 26 may be employed to vary the heat of the plate 17a to suit varying requirements, and a definite number of degrees of variation may be obtained by substituting pads 25 of differing thicknesses and conductivity, by substituting such pads for the pads or plates 26, by rearranging the pads 25 and 26 in any desired order, and by substituting plates 17 or 17a as to thickness or conductivity. In all such arrangements and rearrangements it will be desirable to have the inner surface of the plate 17 or 17a substantially flush with the surface of the body casting at the shoulder 29 and at the corresponding shoulder 48 at the other side of the plate (Figures 2 and 3).

For vulcanizing operations, substitution of plates 17 or 17a will ordinarily not be required, and ordinarily the number or thickness of the pads 25 will not be varied and the pad or plate 26 may not be required. If omitted, it will of course be understood that an additional pad 25 will be substituted. But when a high degree of heat conductivity is desired, a plate 26 composed of copper may be employed, in which event the temperature of the plate 17 will be more nearly uniform throughout its area. It will, of course, be understood that the plate 17 may also be formed of copper if desired.

It is obvious that the plates 17, 17a and 26, with their associated pads, may be made in lengths of any desired extent, and the different sections may each be built up to suit the requirements of the individual sections. Even in a re-treading mold, the new covering may be extended downwardly in any section and properly vulcanized without affecting an adjacent section in which the old covering is being retained.

These changes and variations provide a wide range of adaptation of my improved heat exchanging mold to a great variety of purposes other than vulcanization, such, for example, as the drying of fabrics or other materials, or the acceleration or localization of chemical processes in sheet-like material. The contour of the mold will of course be altered to suit varying requirements.

Therefore, the fact that I have illustrated my invention as applied to a vulcanizing mold is not to be understood as indicating that my invention is limited to a mold of that contour and specific purpose.

I claim:

1. A heat exchanging mold having a body portion composed of heat conductive material and having a heat exchanging surface provided with recessed portions, non-heat conducting pads mounted in the recessed portions, and a heat conducting plate covering said pads and forming a continuation of the heat exchanging surface, said plate having marginal contact with the body portion for predetermining the rate of transfer of heat units to said plate.

2. A heat exchanging mold having a body portion composed of heat conductive material and having a heat exchanging surface provided with recessed portions, non-heat conducting pads mounted in the recessed portions, said body portion having air cavities underneath portions of said pads, and a heat conducting plate covering said pads and forming a continuation of the heat exchanging surface, said plate having marginal contact with the body portion for predetermining the rate of transfer of heat units to said plate.

3. A heat exchanging mold having a body portion composed of heat conductive material, and having a heat exchanging surface provided with a recess of differing depth in different portions, one portion being provided with a heat exchanging plate as a continuation of said heat exchanging surface and another portion being provided with non-heat conducting pads underneath said plate.

4. A heat exchanging mold having a body portion composed of heat conductive material, and having a heat exchanging surface provided with a recess of differing depth in different portions, one portion being provided with a heat exchanging plate as a continuation of said heat exchanging surface and another portion being provided with non-heat conducting pads underneath said plate, and a third portion being formed to provide an air pocket under said pads.

5. A heat exchanging mold having a body portion composed of heat conductive material, and having a heat exchanging surface provided with a recess of differing depth in different portions, one portion being provided with a heat exchanging plate as a continuation of said heat exchanging surface and another portion being provided with non-heat conducting pads underneath said plate, and a third portion being formed to provide an air pocket under said pads, said plate being provided with devices for securing it in position in said recess.

6. A heat exchanging mold having a body portion composed of heat conductive material, and having a heat exchanging surface provided with a recess of differing depth in different portions, one portion being provided with a heat exchanging plate as a continuation of said heat exchanging surface and another portion being provided with non-heat conducting pads underneath said plate, the pad receiving portion of said recess being marginally shouldered and adapted to receive and support pads of different degrees of thickness or conductivity.

7. A heat exchanging mold having a body portion composed of heat conductive material, and having a heat exchanging surface provided with a recess of differing depths in different portions, one portion being provided with a heat exchanging plate as a continuation of said heat exchanging surface and another portion being provided with non-heat conducting pads underneath said plate, said pads being formed of materials of differing conductivity.

8. A heat exchanging mold having a body portion of heat conductive material and means for variably heating portions thereof, in combination with a heat exchanging liner plate having a margin in heat receiving relation to the body portion, and means for limiting heat transfer from the body to the other portions of the liner plate, said means for limiting heat transfer comprising a variable number of removable sheets of non-heat conducting material.

9. A heat exchanging mold having a body portion of heat conductive material and means for variably heating portions thereof, in combination with a heat exchanging liner plate, and means for limiting heat transfer from the body to the liner plate, said body portion having an air cavity underneath the liner plate and non-heat conducting pads interposed between the body portion and the plate.

10. A vulcanizing mold member for vehicle tire casings, comprising a body portion having an annular channel in its side portion between the tread and bead embracing portions, and also having recesses in the base of said channel, in combination with an annular heat conductive plate fitted to said channel with portions at the margins of said recesses providing contacts with the body portion the areas of which predetermine the rate of heat transfer to the said plate, means for heating the body portion, and adjustable means for heat insulating the portions of the liner plate not in contact with the body.

11. The combination with a vulcanizing mold body for vehicle tire casings, of liner plates for the side portions of said mold, and means for limiting heat transfer from the body to the liner plates to the marginal portions of the liner plates, said marginal portions being predetermined in area with reference to a gradual distribution of heat from the tread engaging portion of the body toward the bead engaging portion.

12. The combination with a vulcanizing mold body for vehicle tire casings, of liner plates for the side portions of said mold, and means for preventing material heat transfer from portions of the body to the plate to graduate the heat of the plate with reference to the body, said plates having marginal contacts with the body and non-heat conducting material interposed between other portions of the plate and body.

13. The combination with an annular mold member for tire casing vulcanization having a tread embracing portion, of means for heating the tread embracing portion, an annular liner plate for the side portion of said member provided with margins adapted to receive predetermined heat units from the body, and non-heat conducting material interposed between other portions of said plate and body.

14. The combination with an annular mold member for tire casing vulcanization having a tread embracing portion, of means for heating the tread embracing portion, an annular liner plate for the side portion of said member provided with margins adapted to receive predetermined heat units from the body, and non-heat conducting material interposed between other portions of said plate and body, including laminated non-heat conducted material and pocketed air.

15. In a tire casing re-treading mold member, the combination with a body casting having a tread embracing portion and provided with passages for circulation of heating fluid, a liner plate countersunk in the side of said casting and forming a continuation of the casing embracing surface, and non-heat conducting material interposed between portions of said plate and casting for limiting the rate of heat transfer to the plate.

16. A tire casing vulcanizing mold provided with means for heating the body of the mold and means for directing the heat along the sides of the mold from the tread embracing portion toward the casing bead, said means comprising a thin layer of heat conductive casing embracing material having non-heat conducting material interposed between central portions thereof and the body of the mold.

17. A heat exchanging mold having in combination a heat conductive body provided with a contoured surface adapted to fit one portion of the material to be heated, said body having a recessed extension adapted to embrace another portion of said material, a liner plate receivable in said recessed extension and contoured to fit the material to be heated, said liner plate having marginal portions rabbeted to the body and adapted to receive heat therefrom in proportion to the area of the surfaces in marginal contact with the body to predetermine the rate of heat transfer from the body to the liner plate and the material embraced thereby.

18. A heat exchanging mold having a heat conductive body contoured to fit a portion of the material to be heated, and a removable plate socketed in another portion of the body and also contoured to fit the material to be heated and means for heating the body;—said plate being formed to receive heat from the body along its edge margin and portions of its outer surface adjacent thereto and adapted to distribute such heat to the non-body contacting portions of the plate at a rate predetermined by its conductivity and the area of its body contacting surfaces.

19. A heat exchanging mold having a heat conductive body contoured to fit a portion of the material to be heated, and a removable plate socketed in another portion of the body and also contoured to fit the material to be heated, and means for heating the body, said plate being formed to receive heat from the body along its edge margin and portions of its outer surface adjacent thereto and adapted to distribute such heat to the non-body contacting portions of the plate at a rate predetermined by its conductivity and the area of its body contacting surfaces, said body having a shouldered recess spanned by the non-body contacting portions of the plate and adapted to receive shoulder supported heat conducting and non-heat conducting sheets in positions to serve as backings for said plate.

ERNEST P. ENGSTROM.